Patented May 2, 1933

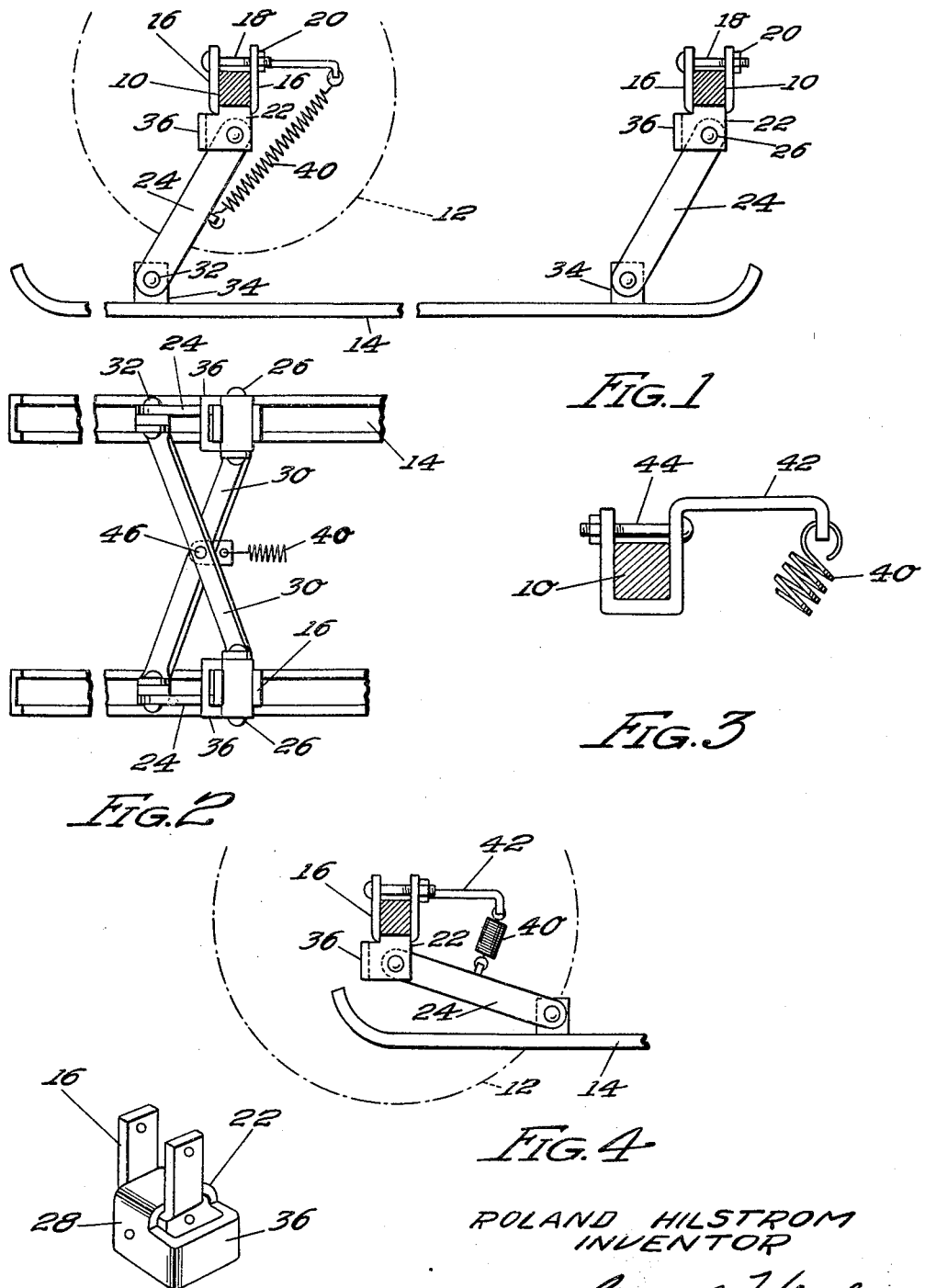

1,907,321

UNITED STATES PATENT OFFICE

ROLAND HILSTROM, OF CHICAGO, ILLINOIS

RUNNER ATTACHMENT FOR VEHICLES

Application filed April 18, 1931. Serial No. 531,056.

This invention relates to improvements in a runner attachment for vehicles, and has for one of its principal objects the provision of means whereby a vehicle, particularly a light vehicle such as a baby carriage, toy wagon or the like, can be practically instantaneously converted from a wheeled structure to one having runners thereon, and vice versa.

One of the important objects of this invention is to provide an attachment for wheeled vehicles whereby the same may be adapted for sled runner operation upon snow or ice by simple manual movement, and which will be capable of substantially automatic reversion to the wheeled type whenever the runners encounter a space free from ice or snow or where sliding operation is difficult.

Still another and further important object of the invention resides in the provision of a runner attachment for vehicles which can be readily applied thereto and which furthermore is inexpensive yet strong and durable.

Other and further important objects of the invention will be apparent from the disclosures in the accompanying drawing and following specification.

The invention, in a preferred form, is illustrated in the drawing and hereinafter more fully described.

In the drawing:

Figure 1 is a side elevation of the improved runner attachment of this invention showing the same as applied to the axles of a vehicle, and with the position of the wheels shown in dotted lines.

Figure 2 is a top plan view of the front portion of the runner structure, the spring connection to the axle being partly omitted.

Figure 3 is a side elevation for the means of attaching the spring to the axle.

Figure 4 is a view similar to the front portion of Figure 1, showing the runner in retracted position, and illustrating the operative position of the wheel in dotted lines.

Figure 5 is a perspective view of one of the elements used for mounting the runner structure on the vehicle axle.

As shown in the drawing:

The reference numerals 10 indicate generally the axles of a vehicle, and for the purposes of this invention, the device is shown as applied to a baby carriage, toy wagon, or the like, but it will be obvious that the same structure in more rugged form can be applied to heavier vehicles. The wheels of the structure are indicated by the dotted lines 12.

A set of runners 14 is adapted to be retractably applied to the axles 10 by means of a set of axle clamps, one of which is shown in Figure 5, each of these clamps comprising essentially a pair of upstanding lugs 16 which form a U-shaped clamp adapted to surround the axle on at least three sides, and to be mounted in position thereon by means of a bolt 18 and a nut 20.

Preferably integral with the clamp element 16 is a pair of down-turned ears 22, one of the ears being adapted for the pivotal connection of a link 24 thereto, this pivotal connection being accomplished by means of a bolt or the like 26. The other ear 28 has pivotally mounted therein the upper end of a cross-brace 30, there being two of these braces as illustrated in Figure 2, the lower ends of which are suitably connected to the lower ends of the links 24 by means of bolts or rivets 32. This connection is made on an upstanding lug 34 mounted on the runner 14.

A stop to limit the forward movement of the link 24 is provided on the clamp element, this being in the nature of a forwardly extending projection 36 shaped as best shown in Figure 5, and which can be either made integral with the clamp element or welded thereto. As best shown in Figure 1, this stop 36 limits the forward movement of the links 24 and also furnishes a brace or support for the weight of the vehicle when the same is in operation as a sled.

In order to automatically retract the runners when dry ground or bare places are encountered, a helical spring 40 is provided, the upper end of this spring being attached to a bracket 42 which is attached to the central portion of the axle 10 by means of a bolt or the like 44. The lower end of the spring is attached to an extension 46 fastened to the brace 30 at the point where they cross each other as best shown in Figure 2.

When the device is in normal use as a wheeled vehicle and it is desired to convert the same into a sled or the like, a simple downward pressure against the rear end of one of the runners or against the cross brace at the back of the structure combined with an upward pull on the vehicle itself will force the runners downwardly and thence forwardly into the position shown in Figure 1 when the vehicle will be supported by the links and runners, and will operate as a sled.

In the event that the bare ground or the like is encountered, a continued forward push or pull on the vehicle will act to retract the runners and the links past the central point of support whereupon the spring 40 will function to still further retract the runners and draw them up under the vehicle into the position shown in Figure 4.

It will be seen that herein is provided a simple and inexpensive runner attachment for vehicles whereby the same can be readily converted to a sled structure and whereby it will further be automatically reconverted to a wheeled structure when the necessity arises. The device is strong and rugged, will function perfectly in all conditions of weather, and being composed of a minimum of parts and with few moving elements is not likely to get out of order. Additionally, it is not necessary to remove the same after being once applied as in the summer time or when the vehicle is run on wheels the runners are up under the bed out of the way.

I am aware that many changes may be made and numerous details of construction varied throughout a wide range without departing from the principles of this invention, and I, therefore do not propose limiting the patent granted hereon otherwise than as necessitated by the prior art.

I claim as my invention:

1. A runner attachment for vehicles, comprising a set of runners, a series of links pivotally mounted on the runners, and means for pivotally mounting the upper ends of the links on the vehicle axle, said means comprising clamps having upstanding U-shaped elements for gripping the axle, and a pair of downwardly extending integral ears, one of said ears adapted to receive the upper end of a link, and a stop for the link forming part of the ears.

2. A runner attachment for vehicles, comprising a set of runners, a series of links pivotally mounted on the runners, and means for pivotally mounting the upper ends of the links on the vehicle axle, said means comprising clamps having upstanding U-shaped elements for gripping the axle, and a pair of downwardly extending integral ears, a stop for a link joining said ears, one of said ears adapted to receive the upper end of a link, and the other of said ears adapted to pivotally receive the upper end of a cross-brace, the lower end of said brace being mounted in cooperative relation with the lower end of the link.

In testimony whereof I affix my signature.

ROLAND HILSTROM.